United States Patent Office 3,350,453
Patented Oct. 31, 1967

3,350,453
ALKYL COMPOUNDS CONTAINING NITROGEN AND FLUORINE
Robert C. Petry and Samuel F. Reed, Jr., Huntsville, Ala., assignors to Rohm & Haas Company, Philadelphia, Pa., a corporation of Delaware
No Drawing. Filed Apr. 14, 1964, Ser. No. 360,175
9 Claims. (Cl. 260—583)

This invention deals with alkyl compounds containing nitrogen and fluorine. It more particularly concerns alkyl mono(difluoramines) as new compositions of matter. It further deals with the preparation of these novel mono-difluoramines). It also deals with novel bis(difluoramines) that have the difluoramino groups on non-vicinal carbon atoms. It also deals with the preparation of these novel bis(difluoramines).

The process of this invention is conducted by reacting an alkane of 1 to 8 carbon atoms with tetrafluorohydrazine at temperatures in the range of about 180° to 500° C., preferably about 200° to 350° C. The reaction is a continuous process employing residence times of about 1 to 10 minutes, preferably 5 to 10 minutes. The reaction results in novel mono(difluoramines) and also known vicinal bis(difluoramine) compounds that are not vicinal in structure. These novel bis(difluoramines) contain from four to eight carbon atoms with always at least one carbon atom separating the carbon atoms bearing the difluoramino group.

It is frequently desirable to conduct the reaction in the presence of an inert gaseous diluent, such as helium or nitrogen.

Typical alkanes employed in the present invention include methane, ethane, butane, hexane and octane. The various possible spatial isomers may be employed, as desired.

The product, which is frequently a mixture of isomers or other somewhat related compounds, can be used as such or, if desired, can be separated as desired, such as by gas chromatography. The products are useful for the purposes of this invention as isolated compounds or as mixtures. Their structures were established by n. m. r. spectra data and elemental analysis. The lower molecular weight products, such as those derived from methane or ethane, are separated by fractionation at reduced temperatures.

The compounds of the present invention are valuable as high energy oxidizing agents in propellants for use in rockets and missiles and are used in amounts and ways known to those skilled in the art. The boiling points of the present products are considerably higher than that of liquid oxygen, a commonly used oxidizer for liquid fuels. Therefore, they can be safely stored in missiles so that the missiles are ready for firing at any desired time.

The novel compounds of the present invention are alkyl mono(difluoramines) wherein the alkyl portion contains from 3 to 8 carbon atoms. These have never been known before nor are they preparable from the known processes. Also novel are bis(difluoramines) from alkanes of 4 to 8 carbon atoms wherein the difluoramine groups are non-vicinal. These are also novel and are not preparable from known processes.

The present invention can be more fully understood from the following examples which are offered by way of illustration and not by way of limitation:

Example I

The reactants, n-butane and tetrafluorohydrazine, and helium were fed from cylinders through flow meters into a copper coil reactor heated to 300° C. The flow rates were adjusted to 10 cc./min. (n-butane), 65 cc./min. ($N_2F_4$) and 32 cc./min. (helium). This mixture was passed through the reactor over a period of 42 minutes. The products and excess reactant on exit from the reactor were collected in traps maintained at −80°, −130° and −196° C. The −80° C. trap contained the major part of the organic materials. The contents of the −80° C. trap were transferred at low temperature to a second trap cooled to −80° C. in an effort to remove any dissolved tetrafluorohydrazine. The contents of the flask were then allowed to warm to ambient temperature followed by opening of the trap to the air. The organic material was transferred to a small glass container and weighed (1.4 g.).

Gas chromatography of the mixture indicated a mixture of products, three of which accounted for approximately 87% of the total mixture. Sufficient quantities of these three major components were separated by gas chromatography for their characterization. They were identified as 1-difluoraminobutane (21%), 2-difluoramino-butane (16%) and 1,2-bis(difluoramino)butane (50%).

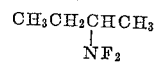

$F^{19}$ n. m. r. Spectrum: Quadruplet centered at −4696 cps. (TFA Standard).
Proton n. m. r. Spectrum: CHNR$_2$, Triplet centered at +148 cps. (J=27 cps.) ($\phi$H Standard).
Calc'd. for $C_4H_9F_2N$: percent C, 44.01; percent H, 8.25; percent F, 34.15; percent N, 12.83. Found: percent C, 43.47; percent H, 7.46; percent F, 34.32; percent N, 13.81.

$$CH_3CH_2CH_2CH_2NF_2$$

$F^{19}$ n. m. r. Spectrum: Singlet at −5292 cps. (TFA Standard).
Proton n. m. r. Spectrum: —CH$_2$NF$_2$, Triplet centered at +138 cps. (J=27 cps.) ($\phi$H Standard).
Calc'd for $C_4H_9F_2N$: percent C, 44.01; percent H, 8.25; percent F, 34.15. Found: percent C, 43.68; percent H, 7.36; percent F, 33.76.

and

$F^{19}$ n. m. r. Spectrum: Singlets at −5342 and −4627 cps. (TFA Standard).
Calc'd for $C_4H_8F_4N_2$: percent F, 47.50. Found: percent F, 47.82.

Example II

Following the procedure of Example I, except in place of n-butane, n-propane was employed, there were obtained as products the following:

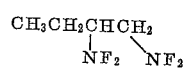

$F^{19}$ n. m. r. Spectrum: Singlet at −4771 cps. [CF$_3$CO$_2$H (TFA Standard)].
Proton n. m. r. Spectrum: CH$_3$, doublet centered at +128 cps. [Benzene ($\phi$H) Standard].
H—C—NF$_2$, series of peaks centered at +138 cps.
Calc'd for $C_3H_7F_2N$: Percent C, 37.90; percent H, 7.37; percent F, 40.00; percent N, 14.75. Found: Percent C, 37.92; percent H, 6.98; percent F, 41.94; percent N, 16.24.

$$CH_2CH_2CH_2NF_2$$

$F^{19}$ n. m. r. Spectrum: Singlet at −5287 cps. (TFA Standard).
Proton n. m. r. Spectrum: Triplet centered at +138 cps. for CH$_2$NF$_2$ (J=28 cps.) ($\phi$H Standard).
Calc'd for $C_3H_7F_2N$: Percent C, 37.90; percent H, 7.37; percent F, 40.00; percent N, 14.75. Found: Percent C, 38.75; percent H, 7.34; percent F, 40.32; percent N, 15.33.

and

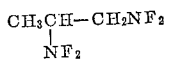

F$^{19}$ n. m. r. Spectrum: Singlets at −5213 and −4457 cps. (TFA Standard).
Proton n. m. r. Spectrum: CH$_3$ doublet centered at +218 cps. (φH Standard).

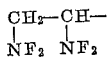

triplet centered at +133 cps.
Calc'd for C$_3$H$_6$F$_4$N$_2$: Percent C, 24.65; percent H, 4.12; percent F, 52.00; percent N, 19.18. Found: Percent C, 25.11; percent H, 4.03; percent F, 52.98; percent N, 18.87.

Example III

Employing the procedure of Example I the following products were obtained employing isobutane instead of n-butane:

(CH$_3$)$_3$CNF$_2$

F$^{19}$ n. m. r. Spectrum: Singlet at −4247 cps. (TFA Standard).
Proton n. m. r. Spectrum: Triplet centered at +230 cps. (J=2 cps.) (φH Standard).
Calculated for C$_4$H$_9$F$_2$N: Percent N, 12.82. Found: Percent N, 13.08.

(CH$_3$)$_2$CHCH$_2$NF$_2$

F$^{19}$ n. m. r. Spectrum: Singlet at −5375 cps. (TFA Standard).
Proton n. m. r. Spectrum: Doublet at +229 and +236 cps. for CH$_3$ (φH Standard).
—CH$_2$NF$_2$ peaks centered at +111, +141, and +176 (J=30 cps.).
Calculated for C$_4$H$_9$F$_2$N: Percent F, 34.85. Found: Percent F, 34.92.

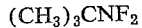

F$^{19}$ n. m. r. Spectrum: Triplet centered at −5647 cps. for —CH$_2$NF$_2$ (TFA Standard). Singlet at −4212 for

Proton n. m. r. Spectrum: Triplet centered at +122 cps. (J=28 cps.) (φH Standard). Singlet at +218 cps.
Calculated for C$_4$H$_8$F$_4$N$_2$: Percent N, 17.50. Found: Percent N, 17.26.

and

CH$_3$CH(CH$_2$NF$_2$)$_2$

F$^{19}$ n. m. r. Spectrum: Triplet centered at −5315 cps. (J=27 cps.) (TFA Standard).
Proton n. m. r. Spectrum: Main triplet centered at +151 cps. (J=29 cps.) (φH Standard). Doublet centered at +245 cps.

Example IV

Employing the method of Example I, except using neopentane instead of n-butane, the following products were obtained:

(CH$_3$)$_3$CCH$_2$NF$_2$

F$^{19}$ n. m. r. Spectrum: Triplet centered at −2501 cps. (Cl$_3$CF Standard).
Proton n. m. r. Spectrum: Triplet at +126, +156, +187 cps. (φH Standard). Triplet centered at +246 for CH$_3$.
Calc'd for C$_5$H$_{11}$F$_2$N: Percent C, 48.70; percent H, 8.95; percent F, 30.90; percent N, 11.38. Found: Percent C, 44.89; percent H, 9.17; percent F, 28.63; percent N, 11.05.

and (CH$_3$)$_2$C(CH$_2$NF$_2$)$_2$

F$^{19}$ n. m. r. Spectrum: Triplet centered at −2510 cps. (Cl$_3$CF Standard).
Proton n. m. r. Spectrum: Triplet at +96, +124 and +154 cps. (φH Standard). Triplet centered at +219 for CH$_3$.
Calculated for C$_5$H$_{10}$F$_4$N$_2$: Percent F, 43.60. Found: Percent F, 43.53.

Example V

Following the procedure of Example I except using n-hexane instead of n-butane, the following products were obtained:

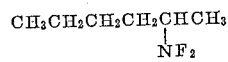

F$^{19}$ n. m. r. Spectrum: Singlet at −1467 cps. (Cl$_3$CF Std.)
Calculated for C$_6$H$_{12}$F$_2$N: Percent C, 53.70; percent H, 8.84. Found: Percent C, 54.11; percent H, 8.72.

CH$_3$CH$_2$CH$_2$CH$_2$CH$_2$CH$_2$NF$_2$

F$^{19}$ n. m. r. Spectrum: Triplet centered at −5346 (TFA Standard).
Calculated for C$_6$H$_{12}$F$_2$N: percent F, 27.94. Found: percent F, 27.47.

and

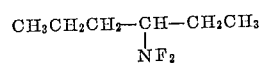

F$^{19}$ n. m. r. Spectrum: Doublet at −4638 and −4619 c.p.s. (TFA Standard).
Calculated for C$_6$H$_{12}$F$_2$N: percent F, 27.94; percent N, 10.30. Found: percent F, 27.61; percent N, 10.01.

Example VI

In a similar way to Example I, methane was reacted with tetrafluorohydrazine and the products were fractionated through traps cooled to −80°, −130° and −196° C. The product, methyldifluoramine, was obtained largely in the −130° C. trap fraction and was identified principally from the infrared spectrum where absorption bands were observed at 1178 cm.$^{-1}$ and 1197 cm.$^{-1}$. The mass spectrograph of this fraction showed a peak at 67 indicating the presence of CH$_3$NF$_2$.

Example VII

In a similar way to Example I, ethane was reacted with tetrafluorohydrazine and the products were fractionated through traps cooled to −80°, −130° and −196° C. The product, ethyldifluoramine, was obtained largely in the −130° C. trap fraction. The infrared spectrum of the −130° C. trap fraction showed strong absorption at 930–989 cm.$^{-1}$ and 850–890 cm.$^{-1}$, indicating ethyl difluoramine. Strong CH absorption was present at 2900–3000 cm.$^{-1}$. Mass spectroscopy revealed a significant peak at 81.

We claim:
1. A bis(difluoramino)alkane wherein the alkane contains from 4 to 8 carbon atoms and the difluoramino groups are on non-vicinal carbon atoms.
2. The composition,

(CH$_3$)$_2$C(CH$_2$NF$_2$)$_2$

3. A process for the preparation of alkyl(difluoramines) wherein the alkyl portion contains from 1 to 8 carbon atoms comprising reacting tetrafluorohydrazine with an alkane of 1 to 8 carbon atoms in the temperature range of about 180° to 500° C.
4. A continuous process for the preparation of alkyl mono(difluoramines) wherein the alkyl portion contains from 1 to 8 carbon atoms comprising reacting tetrafluorohydrazine with an alkane of 1 to 8 carbon atoms in the temperature range of about 200° to 350° C., employing residence times of about 1 to 10 minutes.

5. A process according to claim 4 wherein the reaction is conducted with the aid of an inert gaseous diluent.

6. A process according to claim 3 wherein the alkane is butane.

7. A process according to claim 3 wherein the alkane is pentane.

8. A process according to claim 3 wherein the alkane is hexane.

9. A process according to claim 3 wherein the alkane is propane.

References Cited

UNITED STATES PATENTS 3,166,595  1/1965  Frazer _____ 260—583

CHARLES B. PARKER, *Primary Examiner.*

L. DEWAYNE RUTLEDGE, CARL QUARFORTH, LEON D. ROSDOL, *Examiners.*

L. A. SEBASTIAN, *Assistant Examiner.*